US012651937B2

(12) United States Patent
Kinoshita et al.

(10) Patent No.: US 12,651,937 B2
(45) Date of Patent: Jun. 9, 2026

(54) ROTARY ELECTRIC MACHINE, MOTOR, ROTOR, AND PERMANENT MAGNET MOTOR

(71) Applicant: KABUSHIKI KAISHA TOSHIBA, Tokyo (JP)

(72) Inventors: Eri Kinoshita, Yokohama Kanagawa (JP); Yasuaki Hadame, Arakawa Tokyo (JP); Masaya Hagiwara, Yokohama Kanagawa (JP); Kei Matsuoka, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 188 days.

(21) Appl. No.: 18/479,658

(22) Filed: Oct. 2, 2023

(65) Prior Publication Data

US 2024/0113578 A1 Apr. 4, 2024

(30) Foreign Application Priority Data

Oct. 3, 2022 (JP) ................................. 2022-159657

(51) Int. Cl.
*H02K 1/276* (2022.01)
*H02K 1/02* (2006.01)
(52) U.S. Cl.
CPC .............. *H02K 1/276* (2013.01); *H02K 1/02* (2013.01)
(58) Field of Classification Search
CPC .............................. H02K 1/2733; H02K 1/276
See application file for complete search history.

(56) References Cited

U.S. PATENT DOCUMENTS

| | | | |
|---|---|---|---|
| 2004/0095034 A1 | 5/2004 | Popov | |
| 2006/0022541 A1 | 2/2006 | Ong et al. | |
| 2007/0210663 A1* | 9/2007 | Kalavsky ................. | H02K 1/30 |
| | | | 310/156.19 |

(Continued)

FOREIGN PATENT DOCUMENTS

| | | | | |
|---|---|---|---|---|
| CN | 109149821 A | * | 1/2019 | ........... H02K 1/2733 |
| CN | 110380536 A | * | 10/2019 | ............... H02K 3/42 |

(Continued)

OTHER PUBLICATIONS

CN-214626553-U translation (Year: 2021).*

(Continued)

*Primary Examiner* — Oluseye Iwarere
*Assistant Examiner* — Nicholas Lee Setzer
(74) *Attorney, Agent, or Firm* — Knobbe, Martens, Olson & Bear, LLP

(57) ABSTRACT

According to one embodiment, a rotary electric machine includes a rotor and a stator. The rotor includes a rotary shaft, a first core, a permanent magnet, and an intermediate member. The rotary shaft extends in a first direction. The first core is provided around the rotary shaft in a first plane perpendicular to the first direction. The permanent magnet is provided around the first core in the first plane. The intermediate member is provided between the rotary shaft and the first core. The intermediate member includes a first portion containing a carbon fiber, and a second portion aligned with the first portion in the first direction and containing a metal. The stator is provided around the rotor in the first plane.

19 Claims, 11 Drawing Sheets

(56)                References Cited

U.S. PATENT DOCUMENTS

| | | | | |
|---|---|---|---|---|
| 2013/0187487 A1* | 7/2013 | Honda | ..................... | H02K 1/28 |
| | | | | 310/43 |
| 2015/0086398 A1* | 3/2015 | Teufl | ..................... | H02K 7/083 |
| | | | | 310/90 |
| 2017/0358963 A1* | 12/2017 | Lim | ........................ | H02K 1/278 |
| 2018/0006514 A1* | 1/2018 | Choi | ................... | H02K 41/031 |
| 2018/0294685 A1* | 10/2018 | Ryu | ................... | F04C 29/0085 |
| 2019/0027985 A1 | 1/2019 | Widmer et al. | | |
| 2021/0211003 A1 | 7/2021 | Shimokawa et al. | | |

FOREIGN PATENT DOCUMENTS

| | | | | | | |
|---|---|---|---|---|---|---|
| CN | 111095735 A | * | 5/2020 | ........... | H02K 11/215 |
| CN | 214626553 U | * | 11/2021 | ............... | H02K 1/27 |
| CN | 113991959 A | * | 1/2022 | ............... | H02K 3/47 |
| DE | 102004034176 A1 | * | 2/2006 | ............... | H02K 1/28 |
| JP | 2004-173490 A | | 6/2004 | | |
| JP | 2009-517989 A | | 4/2009 | | |
| JP | 2010-213509 A | | 9/2010 | | |
| JP | 2019502353 A | * | 1/2019 | ............... | H02K 1/30 |
| WO | WO-2007045319 A1 | * | 4/2007 | ............ | H02K 21/46 |
| WO | WO-2017047253 A1 | * | 3/2017 | ............... | H02K 1/28 |
| WO | WO 2020/003414 A1 | | 1/2020 | | |

OTHER PUBLICATIONS

CN-110380536-A translation (Year: 2019).*
Office Action issued in Japanese Patent Application No. 2022-159657, dated Mar. 13, 2026 in 10 pages.

* cited by examiner

ROTARY ELECTRIC MACHINE, MOTOR, ROTOR, AND PERMANENT MAGNET MOTOR

CROSS-REFERENCE TO RELATED APPLICATIONS

This application is based upon and claims the benefit of priority from Japanese Patent Application No.2022-159657, filed on Oct. 3, 2022; the entire contents of which are incorporated herein by reference.

FIELD

Embodiments described herein relate generally to a rotary electric machine, a motor, a rotor, and a permanent magnet motor.

BACKGROUND

There is a rotary electric machine (for example, a motor) including a rotor and a stator. There is a demand for a technique capable of further increasing an output density of the rotary electric machine.

DETAILED DESCRIPTION

Figure 1:
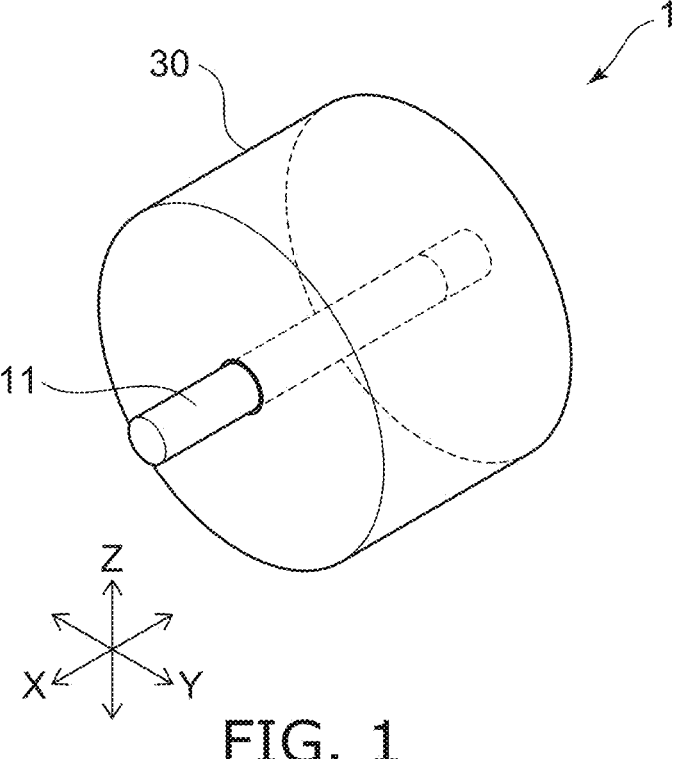
FIG. 1 is a perspective view showing a rotary electric machine according to a first embodiment.

According to one embodiment, a rotary electric machine includes a rotor and a stator. The rotor includes a rotary shaft, a first core, a permanent magnet, and an intermediate member. The rotary shaft extends in a first direction. The first core is provided around the rotary shaft in a first plane perpendicular to the first direction. The permanent magnet is provided around the first core in the first plane. The intermediate member is provided between the rotary shaft and the first core. The intermediate member includes a first portion containing a carbon fiber, and a second portion aligned with the first portion in the first direction and containing a metal. The stator is provided around the rotor in the first plane.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

FIRST EMBODIMENT

Figure 2:
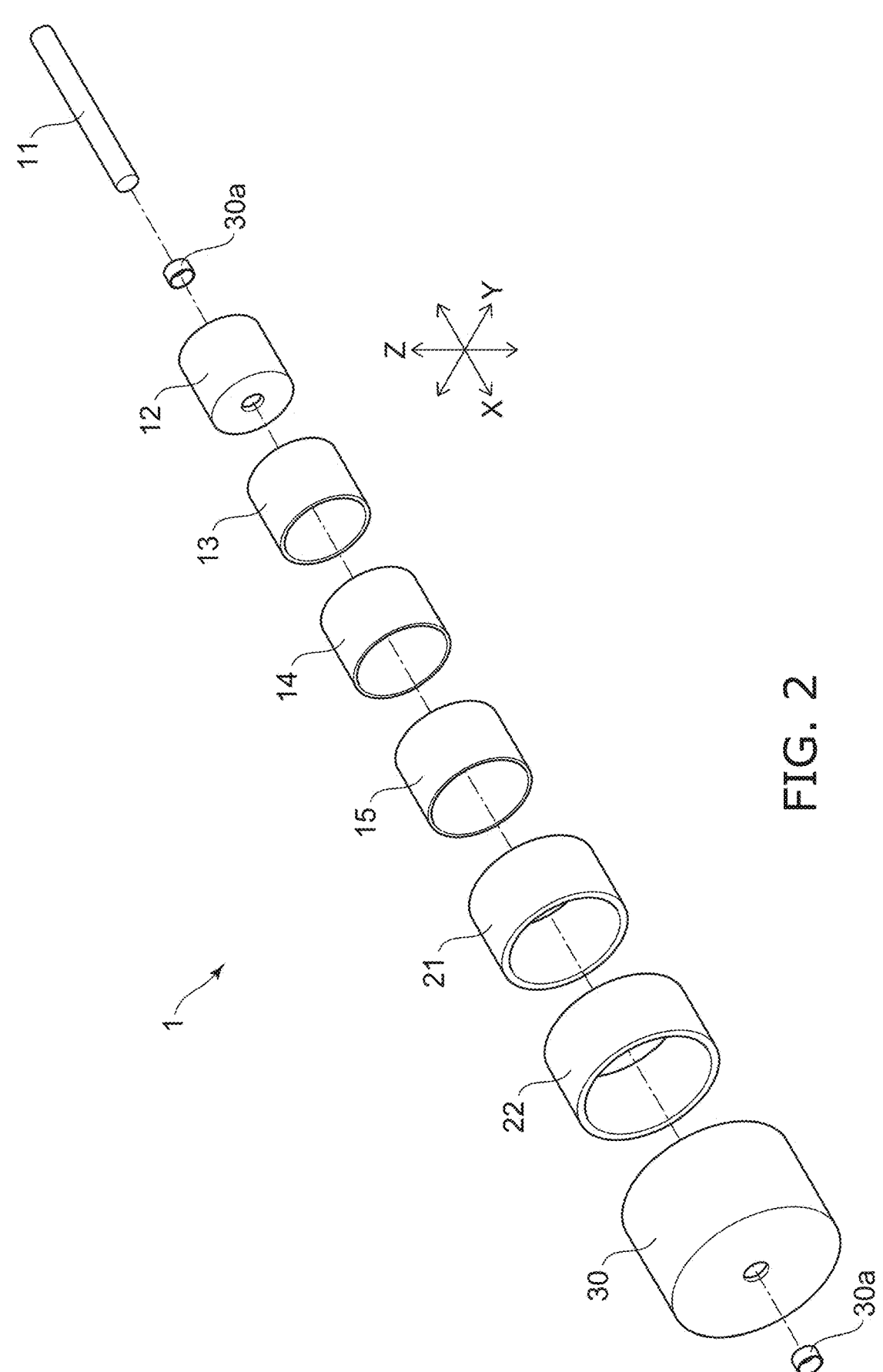
FIG. 2 is an exploded perspective view showing the rotary electric machine according to the first embodiment.
Figure 3:
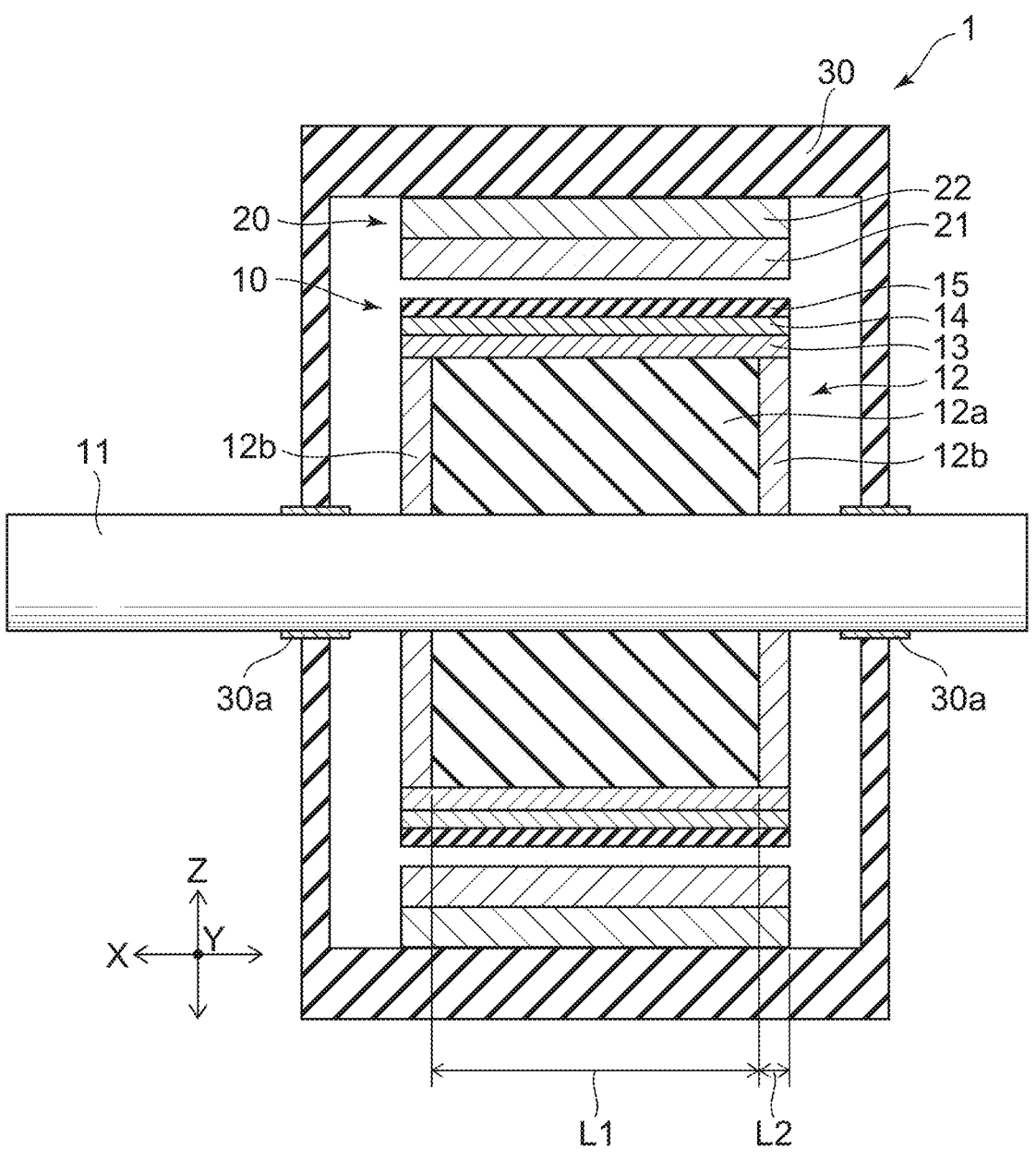
FIG. 3 is a cross-sectional view showing the rotary electric machine according to the first embodiment.

FIG. 1 is a perspective view showing a rotary electric machine according to a first embodiment. FIG. 2 is an exploded perspective view showing the rotary electric machine according to the first embodiment. FIG. 3 is a cross-sectional view showing the rotary electric machine according to the first embodiment.

As shown in FIGS. 1 to 3, a rotary electric machine 1 according to the first embodiment includes a rotor 10, a stator 20, and a housing 30. The stator 20 is provided around the rotor 10. The housing 30 houses the stator 20 and a part of the rotor 10. The rotary electric machine 1 is, for example, a motor. Favorably, the rotary electric machine 1 is a permanent magnet motor (PM motor).

The rotor 10 includes a rotary shaft 11, an intermediate member 12, a rotor core 13 (first core), a permanent magnet 14, and a cover 15.

The rotary shaft 11 is a rod-like member extending in a direction. Here, the direction in which the rotary shaft 11 extends is referred to as an X-direction (first direction). Two directions perpendicular to the X-direction and orthogonal to each other are referred to as a Y-direction and a Z-direction.

The rotor core 13 is provided around the rotary shaft 11 in a Y-Z plane (first plane). The permanent magnet 14 is provided around the rotor core 13 in the Y-Z plane. In an example illustrated, the rotor core 13 and the permanent magnet 14 have a tubular shape. The permanent magnet 14 generates a magnetic field in a direction perpendicular to the X-direction. The magnetic field generated by the permanent magnet 14 passes through the rotor core 13.

For example, the permanent magnet 14 is an alnico magnet, a ferrite magnet, or a rare-earth magnet. Examples of the rare-earth magnet include a samarium-cobalt magnet and a neodymium magnet. From a viewpoint of heat resistance and corrosion resistance, it is favorable that the permanent magnet 14 is the samarium-cobalt magnet. The rotor core 13 contains a soft magnetic material. Favorably, in order to allow a large amount of magnetic fluxes to pass through the rotor core 13, an electromagnetic steel plate is used for the rotor core 13.

The intermediate member 12 is provided between the rotary shaft 11 and the rotor core 13. The intermediate member 12 is provided to couple the rotary shaft 11 and the rotor core 13 and to fix the rotor core 13 to the rotary shaft 11. The intermediate member 12 includes a first portion 12a and second portions 12b. The first portion 12a contains a carbon fiber. The second portions 12b contain a metal. The first portion 12a and the second portions 12b are arranged in the X-direction. For example, the first portion 12a and the second portions 12b are adhered to each other. The first portion 12a and the second portions 12b may be fixed by a screw or the like.

In the example illustrated, the intermediate member 12 includes a pair of second portions 12b separated from each other in the X-direction. The pair of second portions 12b are respectively located at both ends of the intermediate member 12 in the X-direction. Each second portion 12b faces a space in the housing 30. The first portion 12a is located between the pair of second portions 12b. The first portion 12a and the pair of second portions 12b are in contact with the rotary shaft 11 and the rotor core 13.

The cover 15 is provided around the permanent magnet 14 in the Y-Z plane. The cover 15 presses the intermediate member 12, the rotor core 13, and the permanent magnet 14 toward the rotary shaft 11 such that these members are not displaced by a centrifugal force. The cover 15 has sufficient strength to resist the centrifugal force of the intermediate member 12, the rotor core 13, and the permanent magnet 14 when the rotor 10 rotates. For example, the cover 15 contains a carbon fiber or a metal.

The stator 20 is provided around the rotor 10 in the Y-Z plane. A gap exists between the rotor 10 and the stator 20. The stator 20 includes a coil 21 and a stator core 22 (second core).

The coil 21 is provided around the cover 15 in the Y-Z plane. The stator core 22 is provided around the coil 21 in the Y-Z plane. The coil 21 and the stator core 22 have a tubular shape. An inner surface of the stator core 22 may be provided with protrusions and recesses for winding the coil 21 thereon. A current flows through the coil 21. As the coil 21 is energized, a magnetic flux is generated around the coil 21. The generated magnetic flux passes through the stator core 22. Copper is used for the coil 21. It is favorable that an electromagnetic steel sheet is used for the stator core 22 as in a case of the rotor core 13.

In the example illustrated, the housing 30 has a hollow cylindrical shape. A part of the rotary shaft 11, the intermediate member 12, the rotor core 13, the permanent magnet 14, the cover 15, and the stator 20 are provided inside the housing 30. A specific shape of the housing 30 may be appropriately changed as long as at least a part of the rotor 10 and the stator 20 can be accommodated. For example, an attachment portion for attaching the housing 30 to another member may be provided on the housing 30. The housing 30 is attached to the rotary shaft 11 via a bearing 30a. The rotary shaft 11 is rotatable about the X-direction with respect to the housing 30. The housing 30 is in contact with a surface of the stator 20 in the Y-Z plane.

A metal, ceramic, a fiber-reinforced plastic, or the like is used for the housing 30 for weight reduction. An aluminum alloy can be used as the metal. Silicon carbide can be used as the ceramic. A metal matrix composite (MMC) including a metal and ceramic may be used. It is favorable that the fiber-reinforced plastic is a carbon fiber-reinforced plastic (CFRP) containing a carbon fiber. In order to increase rigidity of the housing 30, it is most preferable that the housing 30 contains MMC.

When a current flows through the coil 21 and a magnetic field is generated, an attractive force and a repulsive force are generated between the above magnetic field and the magnetic field generated by the permanent magnet 14. Due to the attractive force or the repulsive force, the rotor 10 rotates around the X-direction inside the stator 20.

Advantages of the first embodiment will be described.

When the rotor 10 rotates, the centrifugal force is applied to the rotor core 13, the permanent magnet 14, and the cover 15. A stress is also applied to the intermediate member 12 that couples the rotary shaft 11 and the rotor core 13 in response to generation of the centrifugal force in these members. As a rotation speed of the rotor 10 increases, the centrifugal force is also increased, and the stress applied to the intermediate member 12 is also increased. It is favorable that the intermediate member 12 has high strength so as not to be damaged even when a large stress is applied.

The intermediate member 12 is required to be light in weight as well as the strength. As the intermediate member 12 is lighter, the centrifugal force of the intermediate member 12 can be reduced, and the stress applied to the intermediate member 12 can be reduced. As the intermediate member 12 is lighter and the rotor 10 is lighter, the rotary electric machine 1 can be lighter. An output of the rotary electric machine 1 per unit weight can be increased. That is, an output density of the rotary electric machine 1 can be increased.

In the rotor 10 according to the first embodiment, the intermediate member 12 includes the first portion 12a. The first portion 12a contains a carbon fiber and has high strength. Therefore, even though the rotation speed of the rotor 10 is increased, the intermediate member 12 is less likely to be damaged. The carbon fiber is lighter than metals. That is, by using the carbon fiber, the strength per unit weight (specific strength) can be increased. By reducing a weight of the intermediate member 12, the centrifugal force of the intermediate member 12 can be reduced, and the stress applied to the intermediate member 12 can be reduced. By increasing the specific strength of the intermediate member 12, the rotation speed of the rotor 10 can be increased while the rotor 10 and the rotary electric machine 1 are reduced in weight, and the output density of the rotary electric machine 1 can be increased.

On the other hand, when the rotation speed of the rotor 10 increases, heat generation in the rotor 10 is also increased. In particular, a largest amount of heat is generated in the permanent magnet 14. When a temperature of the rotor 10 is excessively increased, a magnetic force of the permanent magnet 14 is decreased. A torque based on the magnetic force is decreased, and the output of the rotary electric machine 1 is also decreased. Regarding such a problem, in the rotor 10 according to the first embodiment, the intermediate member 12 includes the second portions 12b. The second portions 12b contain a metal. Therefore, a heat conductivity of the second portions 12b is higher than a heat conductivity of the first portion 12a. By transmitting heat generated in the permanent magnet 14 to the first portion 12a via the rotor core 13, the temperature of the rotor 10 can be prevented from being increased.

The first embodiment provides the rotor 10 unlikely to be damaged, enabling reduction in weight, and enabling prevention of temperature increase during rotation. By applying the rotor 10 to the rotary electric machine 1, the output density of the rotary electric machine 1 can be increased while preventing the temperature of the rotary electric machine 1 from being increased.

Figure 4A:
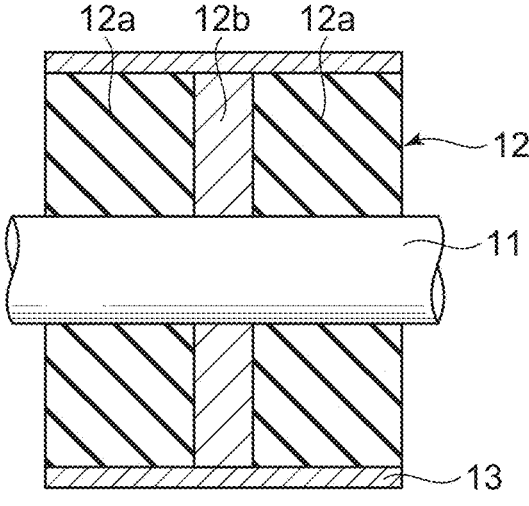
FIGS. 4A to 4C are cross-sectional views showing a part of the rotor according to the first embodiment.
Figure 4B:
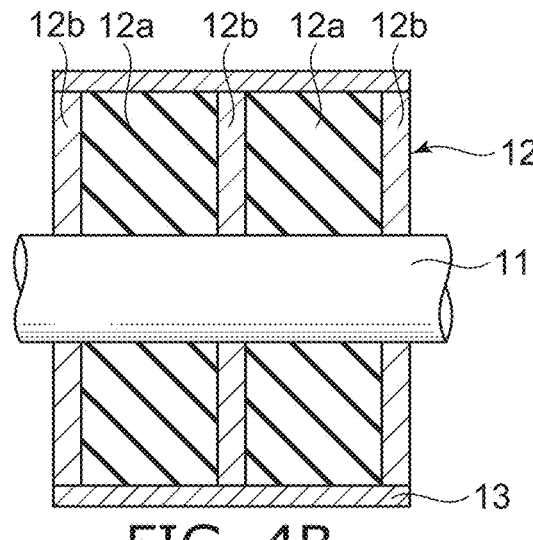
Figure 4C:
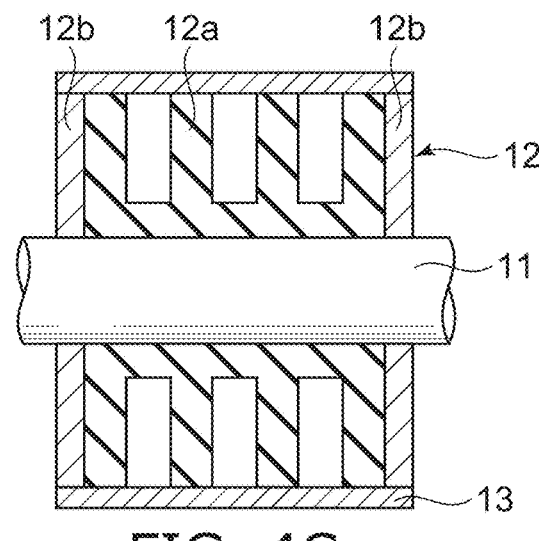
Figure 4C:
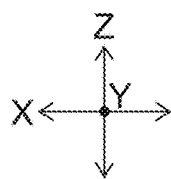

FIGS. 4A to 4C are cross-sectional views showing a part of the rotor according to the first embodiment.

A specific configuration of the intermediate member 12 is not limited to the example illustrated in FIGS. 2 and 3, and may be appropriately changed. For example, as shown in FIG. 4A, the second portion 12b may be provided between a pair of first portions 12a in the X-direction. As shown in FIG. 4B, the first portions 12a and the second portions 12b may be alternately provided in the X-direction. As shown in FIG. 4C, the first portion 12a may include a portion having a large diameter and a portion having a small diameter. The portions having the larger diameter and the portions having the smaller diameter are alternately provided in the X-direction.

Favorably, as shown in FIGS. 3, 4B, and 4C, the second portions 12b are located at end portions of the intermediate member 12 in the X-direction. Since the second portions 12b face a space outside the intermediate member 12, the heat transmitted from the permanent magnet 14 to the second portions 12b is easily discharged to outside of the rotor 10.

Since the pair of second portions 12b are provided at both ends of the intermediate member 12 in the X-direction, heat of the rotor 10 is more easily discharged.

The second portions 12b containing a metal can be easily processed as compared with the first portion 12a containing a carbon fiber. For example, in order to adjust balance of the rotor 10, a part of the intermediate member 12 may be processed (cut). In the balance adjustment, a weight bias in the circumferential direction of the rotor 10 is reduced. When the second portions 12b are located at the end portions of the intermediate member 12, the balance of the rotor 10 can be adjusted by processing the second portions 12b. As compared with the case in which the first portions 12a are located at the end portions of the intermediate member 12, the balance of the rotor 10 can be adjusted more easily.

Most preferably, as shown in FIGS. 3 and 4C, only the first portion 12a is provided between the pair of second portions 12b. By increasing a volume of the first portion 12a, the specific strength of the intermediate member 12 can be further increased.

As shown in FIG. 3, it is favorable that a length L1 of the first portion 12a in the X-direction is longer than a length L2 of each second portion 12b in the X-direction. By making the length L1 longer than the length L2, the specific strength of the intermediate member 12 can be further increased. In particular, by setting the length L1 to be longer than the length L2 while the second portions 12b are positioned at the end portions of the intermediate member 12, the specific strength of the intermediate member 12 can be increased while preventing heat dissipation from being decreased.

It is favorable that the second portions 12b are in contact with the rotor core 13. The second portions 12b are in contact with the rotor core 13, whereby the heat is easily transmitted from the second portion 12b to the rotor core 13, and the heat dissipation of the rotor 10 can be increased.

It is favorable that the first portion 12a contains a fiber-reinforced plastic (CFRP) containing a carbon fiber. By using the CFRP for the first portion 12a, the specific strength of the intermediate member 12 can be increased. Preferably, the first portion 12a is substantially made of the CFRP alone, excluding an impurity and the like.

It is favorable that the metal contained in the second portions 12b has high heat conductivity and is nonmagnetic. The second portions 12b may contain a metal alloy or a metal oxide. The second portions 12b may contain stainless steel or ceramic. Favorably, the second portions 12b contain aluminum. Aluminum has high ductility and can be easily processed. Further, aluminum has high heat conductivity and is nonmagnetic. Preferably, the second portions 12b are substantially made of aluminum or an aluminum alloy, excluding an impurity and the like.

Variations

Figure 5:
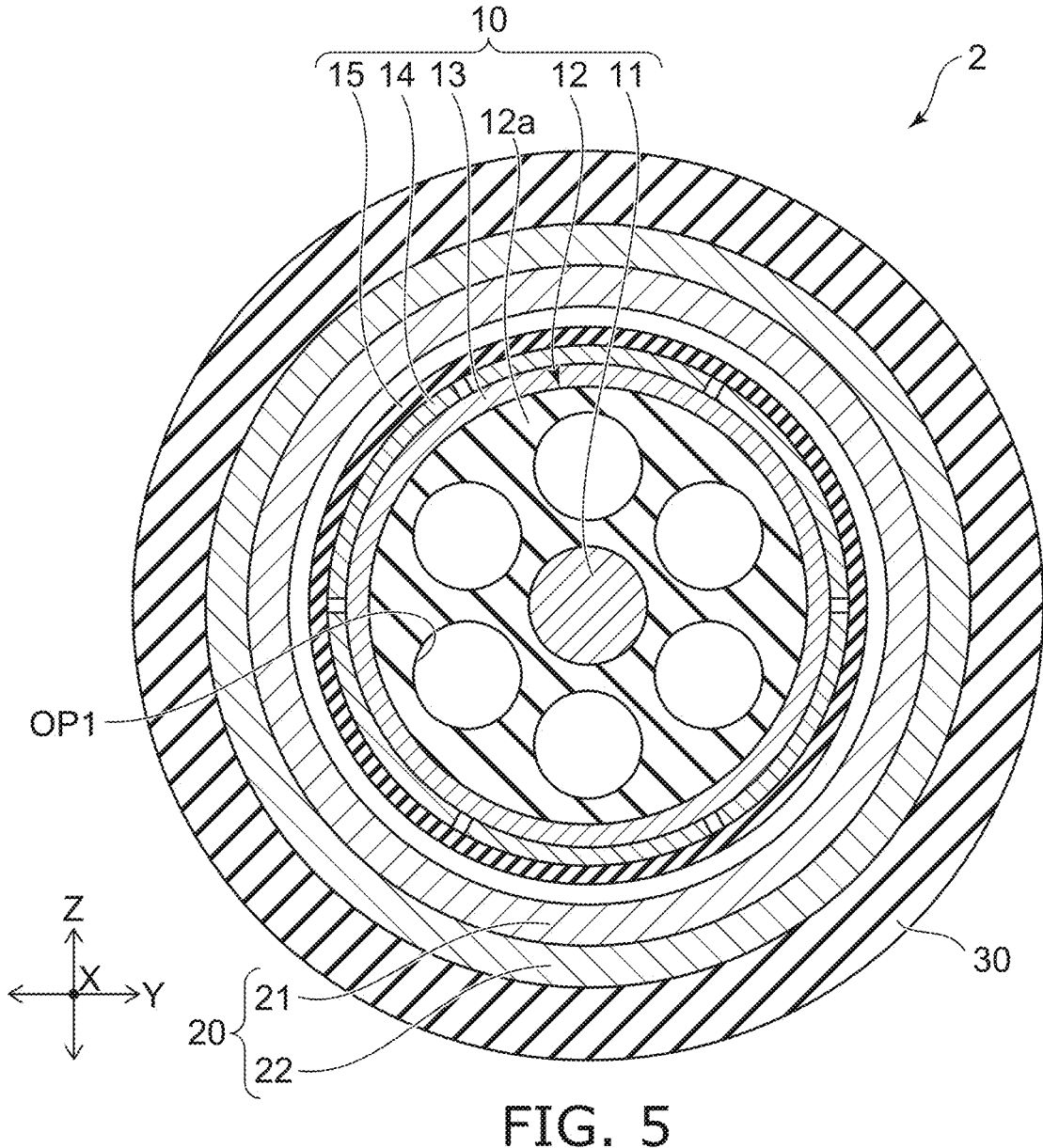
FIG. 5 is a cross-sectional view showing a rotary electric machine according to a variation of the first embodiment.
Figure 6:
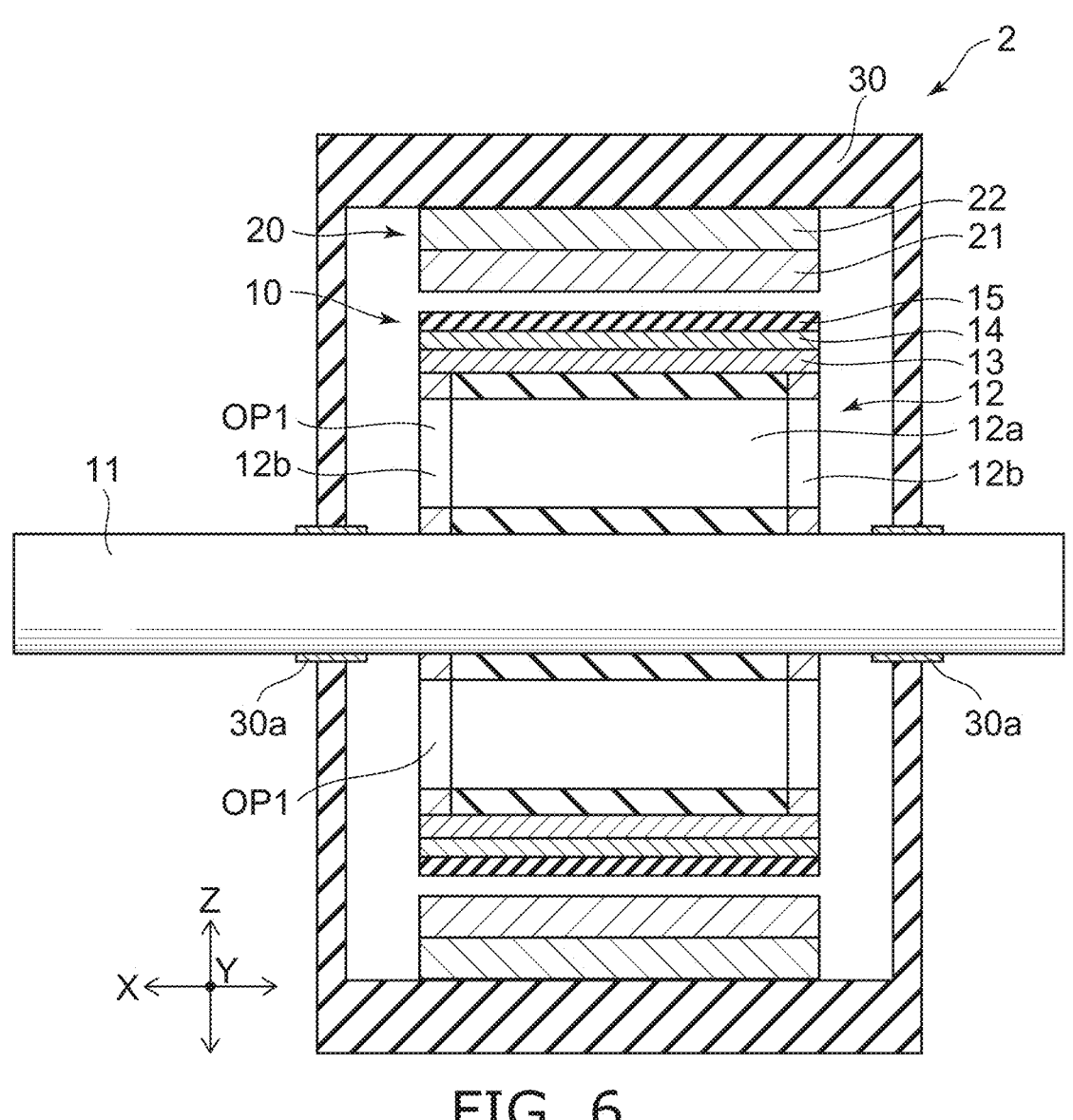
FIG. 6 is a cross-sectional view showing a rotary electric machine according to a variation of the first embodiment.

FIGS. 5 and 6 are cross-sectional views showing a rotary electric machine according to a variation of the first embodiment. FIGS. 5 and 6 respectively show a Y-Z cross section and an X-Z cross section of the rotary electric machine.

As shown in FIGS. 5 and 6, in a rotary electric machine 2 according to the variation, openings OP1 are formed in the intermediate member 12. The openings OP1 extend along the X-direction and penetrate the first portion 12a and the second portions 12b.

By forming the openings OP1, a contact area of the intermediate member 12 with air is increased. In particular, by increasing the contact area of the second portions 12b with the air, heat can be promoted to be discharged from the intermediate member 12, and a temperature of the rotor 10 can be further prevented from being increased.

As shown in FIG. 5, a plurality of permanent magnets 14 may be provided around the rotor core 13. Each of the permanent magnets 14 has an arc shape around the rotary shaft 11. For example, an adhesive is provided in a gap between the permanent magnets 14. An epoxy resin or the like is used as the adhesive. The rotor core 13, the permanent magnets 14, and the cover 15 are adhered to each other with the adhesive.

FIGS. 7, 8A, 8B, 9, 10, and 11 are cross-sectional views showing other rotary electric machines according to variations of the first embodiment.

Figure 7:
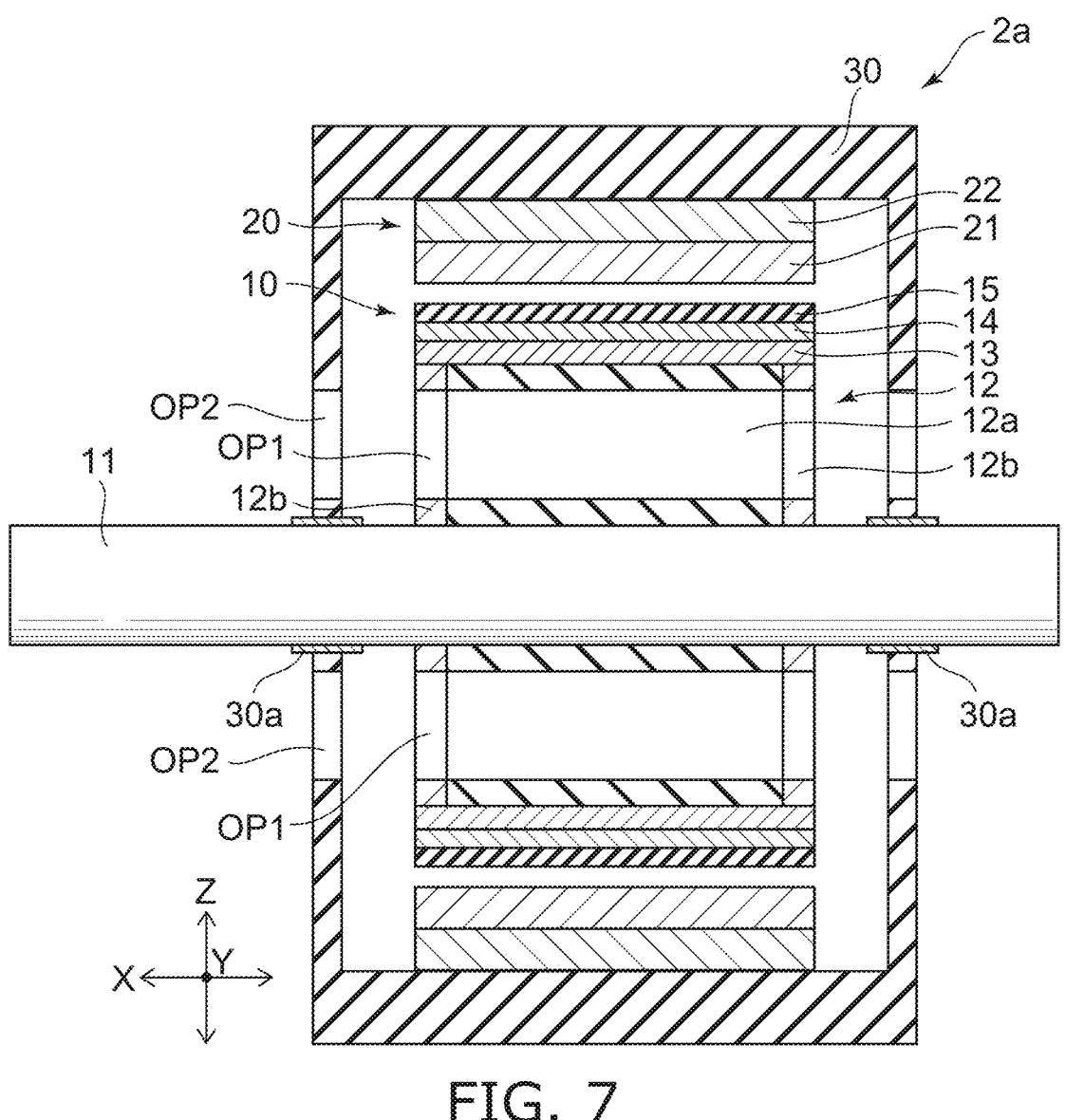
FIGS. 7, 8A, 8B, 9, 10, and 11 are cross-sectional views showing other rotary electric machines according to variations of the first embodiment.
Figure 8A:
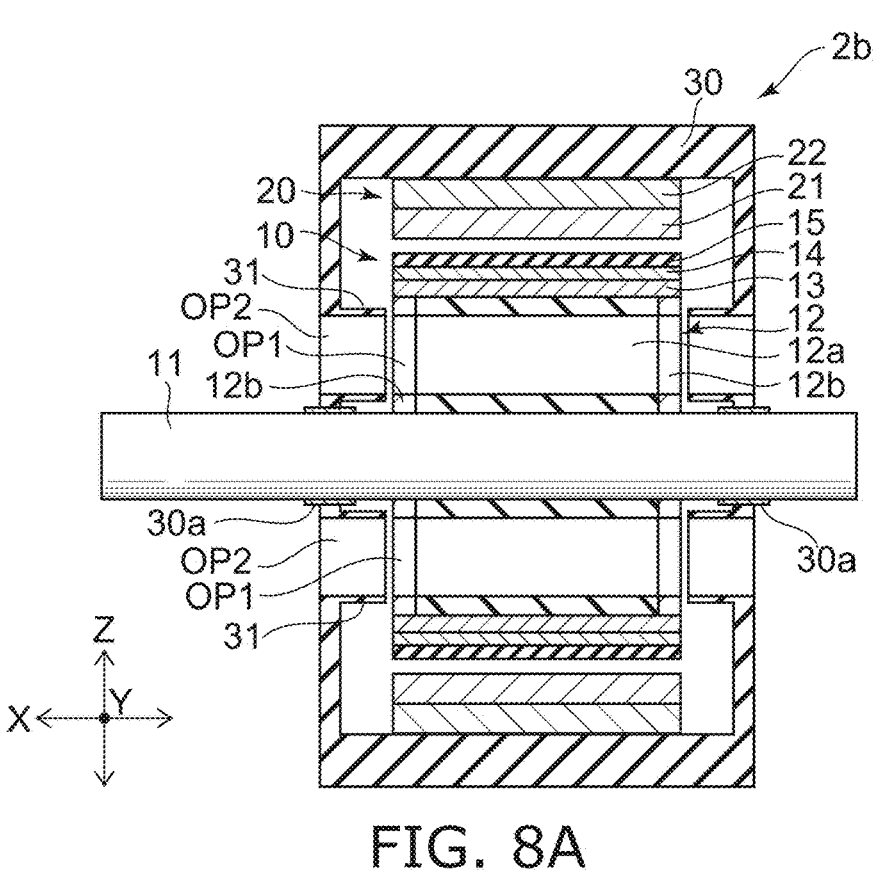
Figure 8B:
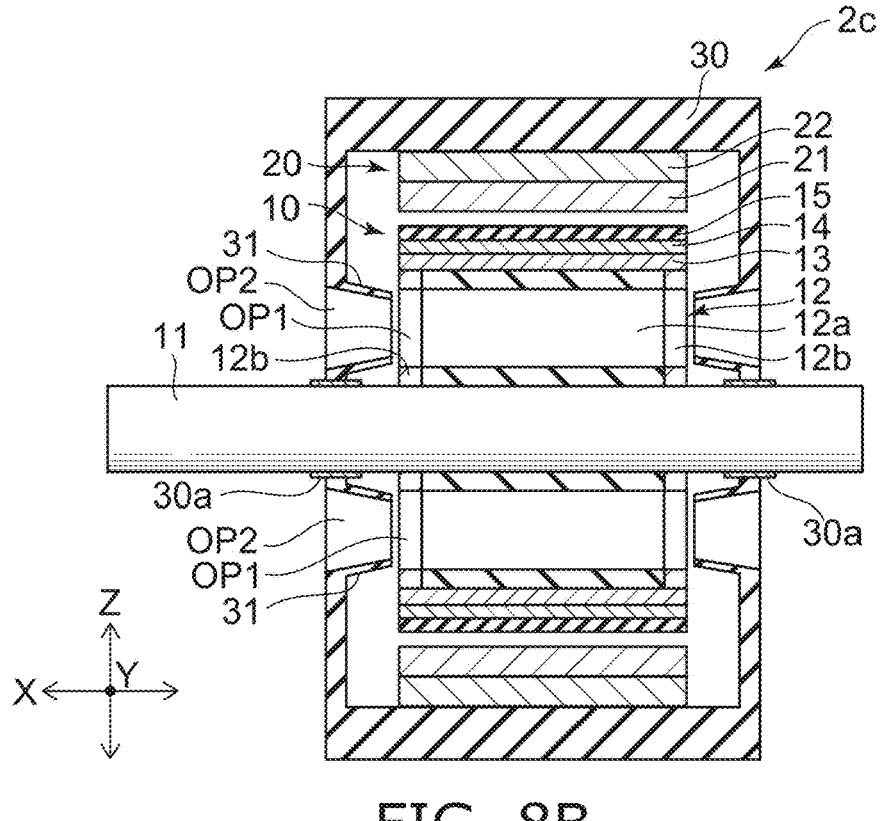
Figure 9:
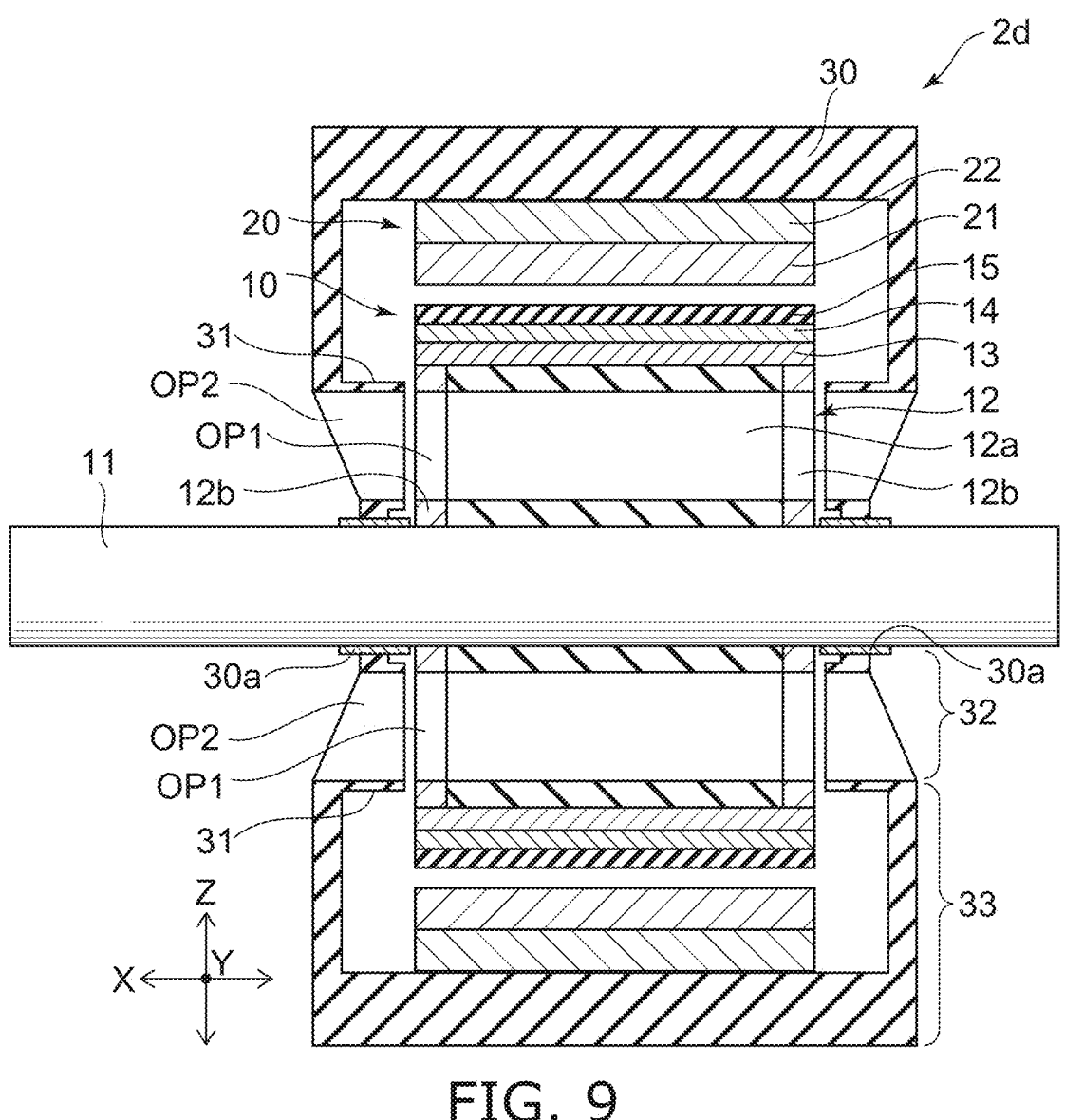
Figure 10:
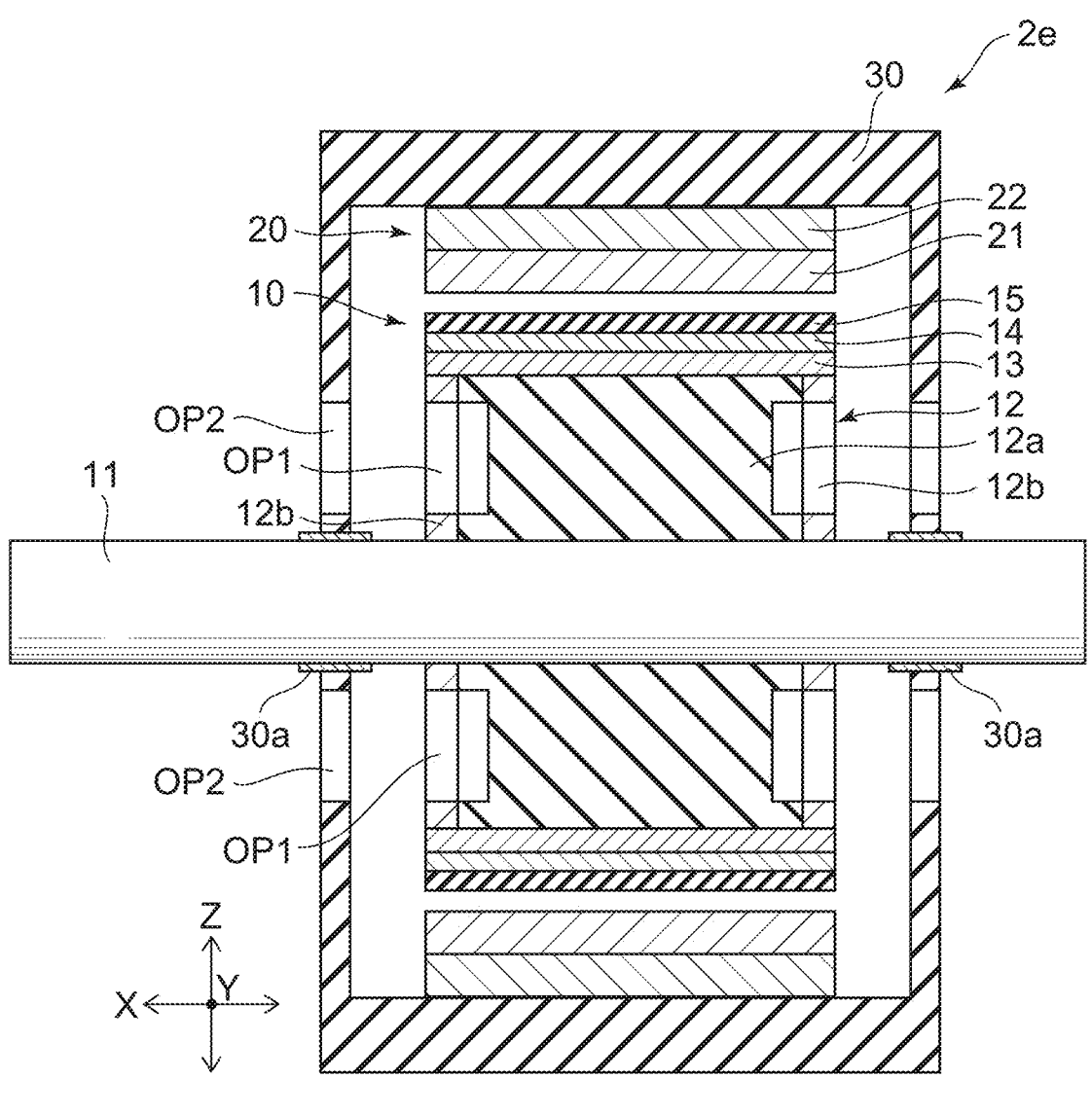
Figure 11:
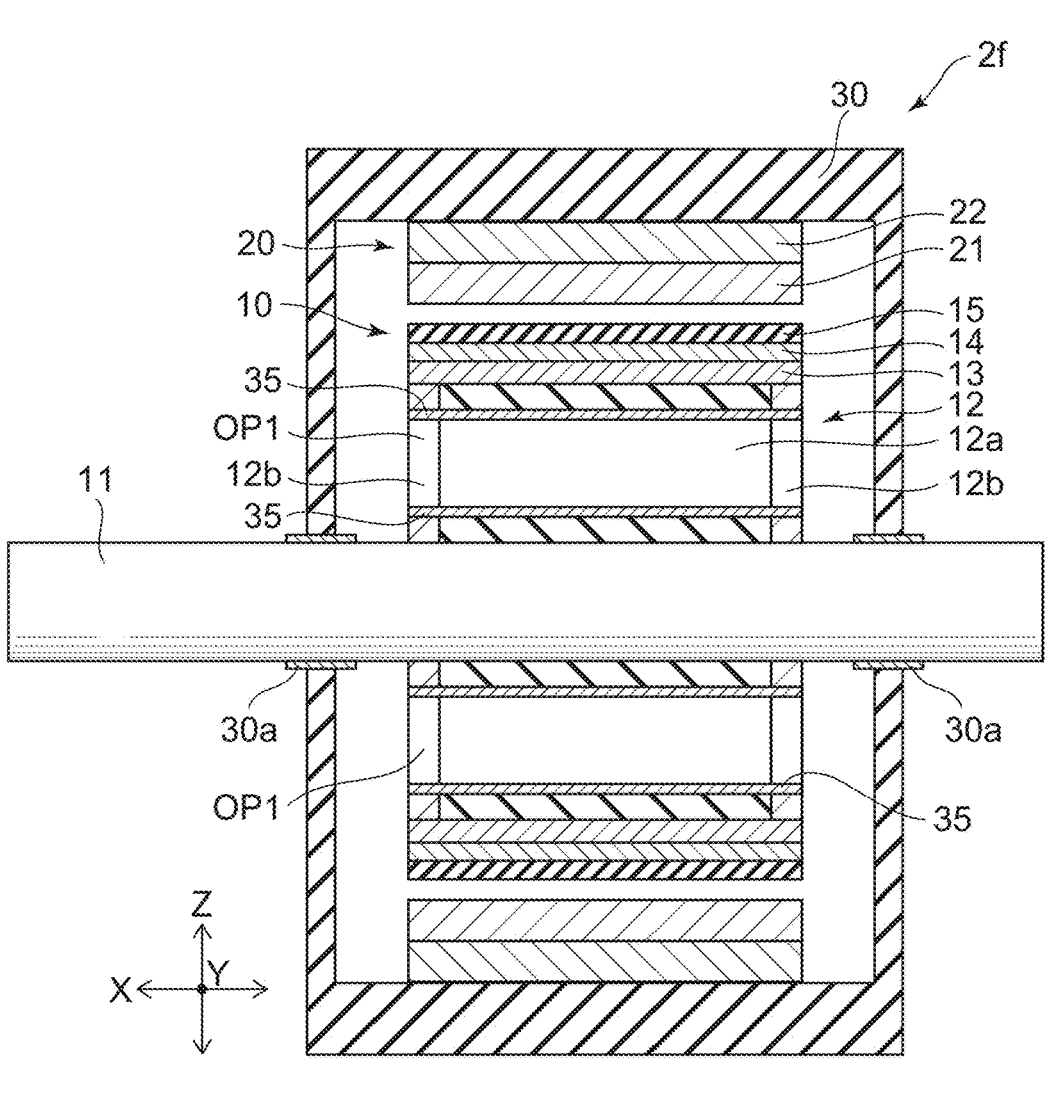

As shown in FIG. 7, openings OP2 may be provided in the housing 30. As shown in FIGS. 8A and 8B, protrusions 31 protruding toward the rotor 10 may be provided around the openings OP2 of the housing 30. As shown in FIG. 9, a length of a part of the housing 30 in the X-direction may be short. As shown in FIG. 10, the openings OP1 may not penetrate the intermediate member 12. As shown in FIG. 11, a metal film 35 may be provided along an inner wall of each opening OP1.

In a rotary electric machine 2a shown in FIG. 7, the openings OP2 penetrates the housing 30 in the X-direction. A shape of the openings OP2 in the Y-Z plane may be the same as or different from a shape of the openings OP1 in the Y-Z plane.

By providing the openings OP2, air outside the rotary electric machine 2a flows into the openings OP1. The air warmed by the heat of the rotor 10 is replaced with the air outside the rotary electric machine 2a. Accordingly, it is possible to further prevent the temperature of the rotor 10 from being increased.

In a rotary electric machine 2b shown in FIG. 8A, the protrusions 31 provided around the openings OP2 extend in parallel in the X-direction. In a rotary electric machine 2c shown in FIG. 8B, the protrusions 31 extend in a direction inclined in the X-direction.

In a rotary electric machine 2d shown in FIG. 9, the housing 30 includes a central portion 32 and a peripheral portion 33. The central portion 32 is aligned with the intermediate member 12 in the X-direction. The peripheral portion 33 is provided around the central portion 32 in the Y-Z plane. A length of the central portion 32 in the X-direction is shorter than a length of the peripheral portion 33 in the X-direction. Bearings 30a are provided between the protrusions 31 of the central portion 32 and the rotary shaft 11.

According to a structure shown in FIG. 9, the bearings 30a can be disposed closer to the intermediate member 12, the rotor core 13, the permanent magnet 14, and the like than the other structures. A distance between the bearings 30a separated from each other in the X-direction can be shortened. Accordingly, a resonance frequency of the bearings 30a can be increased, and resonance in the bearings 30a can be prevented from occurring.

In a rotary electric machine 2e shown in FIG. 10, the openings OP1 pass through the second portions 12b and do not penetrate the first portion 12a. For example, in the first portion 12a, the CFRP is provided at a position aligned with the openings OP1 in the X-direction. By forming the openings OP1 in the second portions 12b having high heat conductivity, the temperature of the rotor 10 can be effectively prevented from being increased. The openings OP1 do not penetrate the first portion 12a, whereby strength decrease of the first portion 12a due to forming the openings OP1 can be prevented.

Preferably, the openings OP1 penetrate the entire intermediate member 12 along the X-direction. When the openings OP1 pass through the intermediate member 12, air can pass through the intermediate member 12, and thus the heat of the rotor 10 is more easily discharged. The weight of the intermediate member 12 can be reduced, whereby resonance in the rotor 10 can be prevented from occurring.

In a rotary electric machine 2f shown in FIG. 11, the metal film 35 is provided along the inner wall of the respective openings OP1, and the metal film 35 is in contact with the first portion 12a and the second portions 12b. A thickness of the metal film 35 is sufficiently smaller than a diameter of each opening OP1. The metal film 35 includes a metal. It is favorable that the metal has a high heat conductivity and is nonmagnetic. For example, the metal film 35 contains aluminum. Preferably, the metal film 35 is substantially made of aluminum or an aluminum alloy alone, excluding an impurity and the like.

By providing the metal film 35, heat of the intermediate member 12 is more easily discharged through the metal film 35. As a result, it is possible to further prevent the temperature of the rotor 10 from being increased.

The rotary electric machines 1 and 2a to 2e according to the first embodiment can be applied to various applications. For example, the rotary electric machines 1 and 2a to 2e are suitable for equipment that requires a large output, such as a car and an aircraft.

Specific shapes of the respective devices described above can be appropriately combined. For example, the rotor 10 of the rotary electric machine 1 may be provided with a plurality of arc-shaped permanent magnets 14 as shown in FIG. 5. The intermediate member 12 shown in FIGS. 4A to 4C may be provided with the openings OP1 shown in FIG. 6 or 10.

SECOND EMBODIMENT

Figure 12:
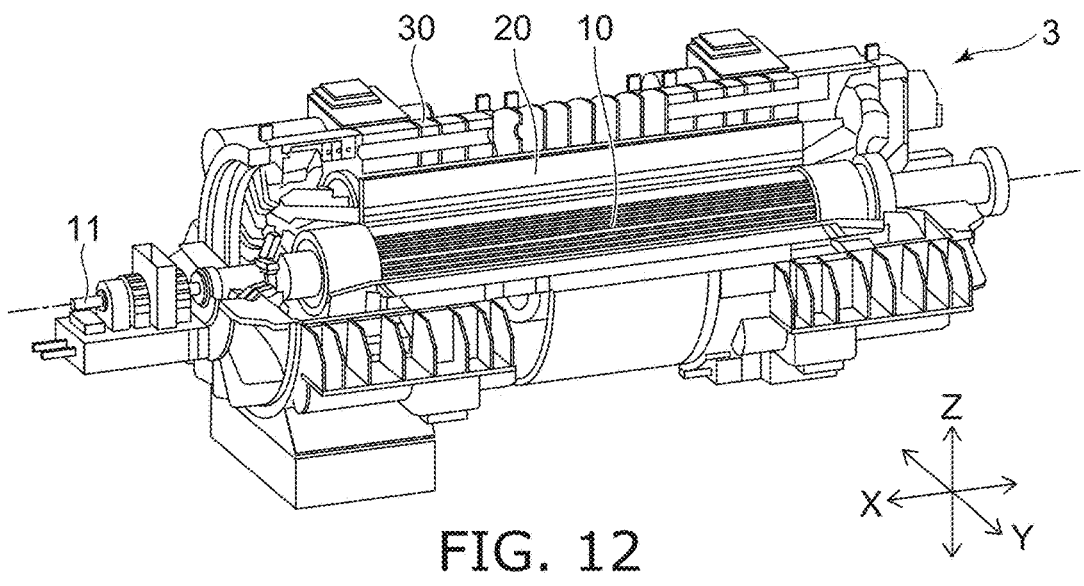
FIG. 12 is a perspective view showing a rotary electric machine according to a second embodiment.

FIG. 12 is a perspective view showing a rotary electric machine according to a second embodiment.

A rotary electric machine 3 according to the second embodiment shown in FIG. 12 includes the rotor 10, the stator 20, and the housing 30. In FIG. 12, in order to show an internal structure of the rotary electric machine 3, a part of the stator 20 is omitted, and a cross section thereof is shown. The rotary electric machine 3 is, for example, a generator.

The stator 20 is provided around the rotor 10. The rotor 10 rotates around the X-direction inside the stator 20. The housing 30 houses a part of the rotor 10 and the stator 20. As configurations of the rotor 10, the stator 20, and the housing 30 in the rotary electric machine 3, configurations similar to those of the rotor 10, the stator 20, and the housing 30 in the rotary electric machine 1 or 2 can be applied. As the rotor 10 rotates inside the stator 20, an induced electromotive force is generated to generate power.

In the rotary electric machine 3 according to the second embodiment, the intermediate member 12 of the rotor 10 includes the second portion 12b as in the first embodiment. Therefore, the second embodiment provides the rotor 10 unlikely to be damaged, enabling reduction in weight, and enabling prevention of temperature increase during rotation. By applying the rotor 10 to the rotary electric machine 3, an output density of the rotary electric machine 3 can be increased while preventing the temperature of the rotary electric machine 3 from being increased.

The embodiments may include the following configurations.

Configuration 1

A rotary electric machine comprising:
a rotor including
 a rotary shaft extending in a first direction,
 a first core provided around the rotary shaft in a first plane perpendicular to the first direction,
 a permanent magnet provided around the first core in the first plane, and
 an intermediate member provided between the rotary shaft and the first core, the intermediate member including
  a first portion containing a carbon fiber and
  a second portion aligned with the first portion in the first direction and containing a metal; and a stator provided around the rotor in the first plane.

Configuration 2

The machine according to Configuration 1, wherein
the intermediate member includes a pair of the second portions, and
the first portion is located between the pair of second portions in the first direction.

Configuration 3

The machine according to Configuration 2, wherein
the pair of second portions are respectively located at both ends of the intermediate member in the first direction.

Configuration 4

The machine according to Configuration 2 or 3, wherein
the pair of second portions are each in contact with the first core.

Configuration 5

The machine according to any one of Configurations 2 to 4, wherein
a length of the first portion in the first direction is longer than a length of each of the pair of second portions in the first direction.

Configuration 6

The machine according to any one of Configurations 1 to 5, wherein
the first portion includes a fiber-reinforced plastic containing the carbon fiber, and
the second portion contains aluminum.

Configuration 7

The machine according to any one of Configurations 1 to 6, wherein
an opening is formed in the intermediate member.

Configuration 8

The machine according to Configuration 7, wherein the opening penetrates the intermediate member along the first direction.

Configuration 9

The machine according to any one of Configurations 1 to 8, wherein
the stator includes
a coil provided around the permanent magnet in the first plane, and
a second core provided around the coil in the first plane.

Configuration 10

A motor using the rotary electric machine according to any one of Configurations 1 to 9.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the rotary electric machines, the motors, the rotors or the permanent magnet motors such as rotary shafts, intermediate members, rotor cores, permanent magnets, covers, coils, stator cores, housings, and openings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all rotary electric machines, motors, rotors, and permanent magnet motors practicable by an appropriate design modification by one skilled in the art based on the rotary electric machines, the motors, the rotors and the permanent magnet motors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A rotary electric machine comprising:
a rotor including:
a rotary shaft extending in a first direction,
a first core provided around the rotary shaft in a first plane perpendicular to the first direction, a permanent magnet provided around the first core in the first plane, and
an intermediate member provided between the rotary shaft and the first core, a first opening being formed in the intermediate member, the intermediate member including:
a first portion containing a carbon fiber,
a second portion aligned with the first portion in the first direction and containing a metal, and
a metal film provided on an inner surface of the first opening; and
a stator provided around the rotor in the first plane.

2. The machine according to claim 1, wherein
the intermediate member includes a pair of the second portions, and
the first portion is located between the pair of second portions in the first direction.

3. The machine according to claim 2, wherein
the pair of second portions are respectively located at both ends of the intermediate member in the first direction.

4. The machine according to claim 2, wherein
the pair of second portions are each in contact with the first core.

5. The machine according to claim 2, wherein
a length of the first portion in the first direction is longer than a length of each of the pair of second portions in the first direction.

6. The machine according to claim 1, wherein
the first portion includes a fiber-reinforced plastic containing the carbon fiber, and
the second portion contains aluminum.

7. The machine according to claim 6, wherein the metal film contains aluminum.

8. The machine according to claim 1, wherein the first opening penetrates the intermediate member along the first direction.

9. The machine according to claim 1, wherein
the stator includes
a coil provided around the permanent magnet in the first plane, and
a second core provided around the coil in the first plane.

10. A motor using the rotary electric machine according to claim 1.

11. A rotor comprising:
a rotary shaft extending in a first direction;
a first core provided around the rotary shaft in a first plane perpendicular to the first direction;
a permanent magnet provided around the first core in the first plane; and
an intermediate member provided between the rotary shaft and the first core, a first opening being formed in the intermediate member, the intermediate member including:
a first portion containing a carbon fiber,
a second portion aligned with the first portion in the first direction and containing a metal, and
a metal film provided on an inner surface of the first opening.

12. The machine according to claim 8, wherein a length in the first direction of the metal film is greater than a length in the first direction of each of the first and second portions.

13. The machine according to claim 8, wherein a thickness of the metal film is less than a diameter of the first opening.

14. The machine according to claim 8, wherein a plurality of the first openings is provided around the rotary shaft, and a plurality of the metal films is respectively provided on a plurality of the inner surfaces of the first openings.

15. The machine according to claim 1, further comprising a housing, the stator and a part of the rotor being located inside the housing.

16. The machine according to claim 15, wherein a second opening is provided on the housing.

17. The machine according to claim 16, wherein a plurality of the second openings is provided around the rotary shaft in the first plane.

18. The machine according to claim 16, wherein the second opening is aligned with the intermediate member in the first direction.

19. The machine according to claim 16, wherein at least part of the second opening is aligned with the first opening in the first direction.

* * * * *